Oct. 25, 1966  G. V. WOODLING  3,280,667
TAPERED HOOK JAW SHANKS FOR PIPE WRENCHES
Filed Feb. 8, 1965
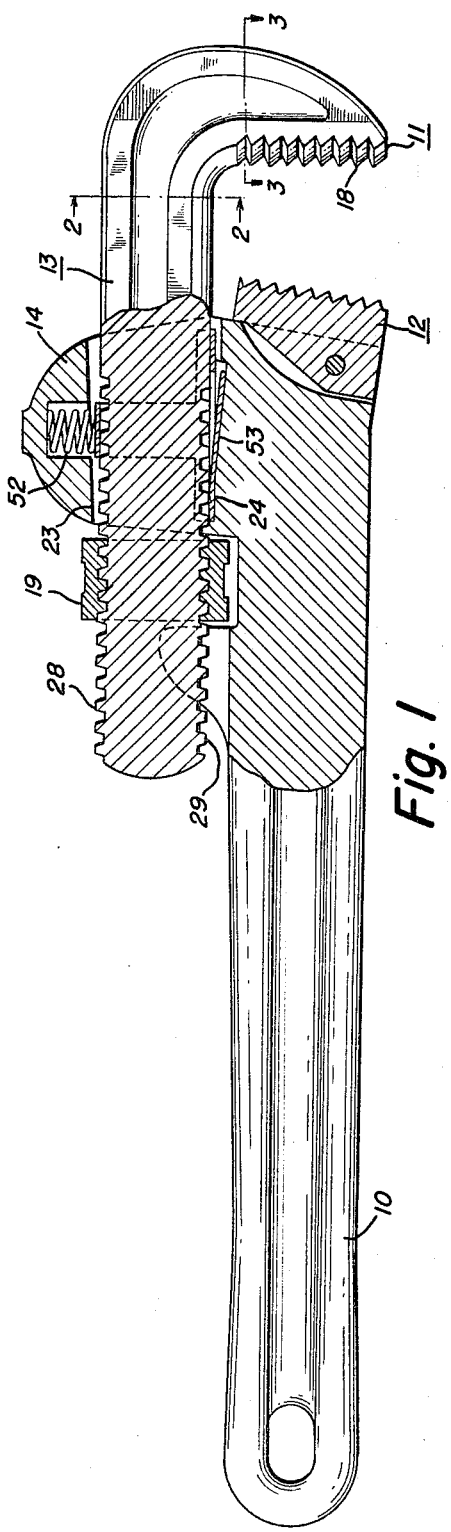
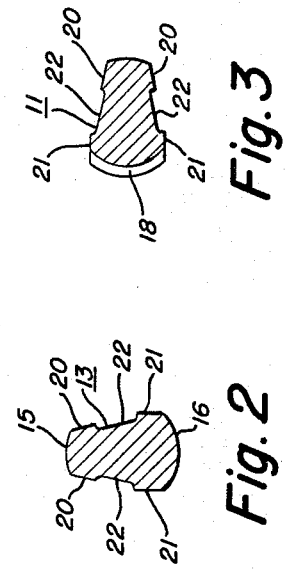
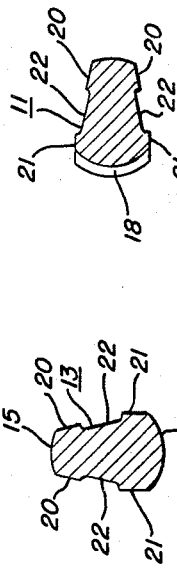
INVENTOR.
GEORGE V. WOODLING
BY
Woodling, Krost, Granger and Rust
attys.

United States Patent Office 3,280,667
Patented Oct. 25, 1966

3,280,667
TAPERED HOOK JAW SHANKS FOR
PIPE WRENCHES
George V. Woodling, 22077 W. Lake Road,
Rocky River, Ohio
Filed Feb. 8, 1965, Ser. No. 430,937
4 Claims. (Cl. 81—101)

My invention relates to improvements in hook jaw shanks for pipe wrenches.

An object of my invention is the provision of a tapered shank comprising an inverted substantially V-shaped cross-section.

Another object is the provision of a tapered shank having substantially arcuate top and bottom surfaces comprising substantially cylindrical segments, wherein the bottom embraces a wider substantial cylindrical segment than does that of the top surface.

Another object is the provision of a tapered shank having top and bottom surfaces with sloping side surfaces defining an included angle therebetween residing in a range from approximately 12 to 36 degrees.

Another object is the provision of a tapered shank having a top surface substantially the same width as that of a standard wrench and having a bottom surface substantially the same width as the width of the hook jaw.

Another object is the provision of a hook jaw and a shank integrally meeting with each other and defining substantially an integral angular juncture, whereby said shank near said juncture has a cross-sectional area substantially the same as that of said hook jaw near said juncture.

Another object is the provision of a gripping jaw face having an arcuate surface comprising substantially a cylindrical segment extending from one side of the jaw to the other.

Another object of my invention is the provision of a gripping jaw face having an arcuate surface comprising substantially a cylindrical segment extending from one side of the jaw to the other, the arcuate surface being substantially the same as that for the bottom surface of the shank.

Other objects and a fuller understanding of this invention may be had by referring to the following description and claims, taken in conjunction with the accompanying drawings, in which:

FIGURE 1 is a side view, partly in section, of a pipe wrench having a tapered hook jaw shank embodying the features of my invention;

FIGURE 2 is a cross-sectional view of the tapered shank taken along the lines 2—2 of FIGURE 1 near the juncture where the hook jaw meets the shank; and FIGURE 3 is a cross-sectional view of the hook jaw, taken along the lines 3—3 of FIGURE 1 near the juncture where the hook jaw meets the shank.

With reference to the drawing, a pipe wrench in which my invention may be incorporated may comprise a handle 10 having a hook jaw 11 and a handle jaw 12. Integrally connected to the hook jaw 11 is my improved tapered shank 13 comprising an inverted substantially V-shaped cross-section, see FIGURE 2. The tapered shank 13 is of a new construction and is very rigid and strong, capable of withstanding the application of high torque. The tapered shank 13 is resiliently mounted for rocking action in a housing 14 which is an integral part of the handle 10. An adjusting nut 19 threadably engages the threads on the shank for securing the shank in the housing which has an internal wall defining an opening through which the shank extends. The shank 13 has top and bottom substantially arcuate surfaces 15 and 16 and opposite sloping side surfaces. The top and bottom arcuate surfaces 15 and 16 each comprise substantially a cylindrical segment with the bottom surface embracing a wider segment than the top surface, thereby producing the sloping side surfaces. The width of the bottom surface 16 of the shank is preferably the same width as the width of the hook jaw 11, thereby producing a strong angular juncture where the jaw 11 meets the shank. With my improved inverted substantially V-shaped shank in cross-section, the maximum strength is where the maximum strain is. This is a new concept in pipe wrenches. In a standard 10-inch pipe wrench, the width of the hook jaw is approximately 11/16 of an inch and the width of the shank is approximately 3/8 inch. Thus, in my shank, the top surface is approximately 3/8 inch in width and the bottom surface is approximately 11/16 inch in width. The height of the shank is approximately the same as that for the standard shank, being approximately 13/16 of an inch. Preferably, the sloping sides of the tapered shank 13 each comprise top and bottom ribs 20 and 21 between which there is a sunken sloping wall 22. The hook jaw 11 and the tapered shank 13 may be forged or cast of alloy steel, preferably stainless steel to give added strength. In manufacture, the face of the ribs 20 and 21 may be machined or ground smooth. The faces of the opposed top ribs 20 are preferably machined or ground at an angle with respect to each other whereby the included angle therebetween resides in a range of approximately 12 to 36 degrees. In FIGURE 2 of the drawing, the included angle is approximately 24 degrees. The faces of the opposed bottom ribs 21 are preferably machined or ground substantially parallel to each other. When a downward force is applied to the handle, the bottom surface 16 of the shank will press downwardly against the bottom wall 24 at the front of the opening of the housing 14 and the top surface 15 will press upwardly against the top wall 23 at the rear of the opening of the housing 14. The hook jaw 13 is also provided with top and bottom ribs 20 and 21 with a sunken wall 22 therebetween, the same as the shank 13, see FIGURE 3. In other words, the sides of the hook jaw 11 constitutes substantially a continuation of the sides of the shank 13.

The opening defined by the internal wall of the housing is sufficiently large relative to the shank to permit pivotal or rocking movements of the shank in the housing under the influence of a top coil spring 52 and a bottom supporting spring structure 53. The opposed springs tend to resiliently center the shank in the opening of the housing.

The top and bottom surfaces of the shank are provided, respectively, with threads 28 and 29 which are threadably engaged by the adjusting nut 19. Since the bottom surface 16 of the tapered shank is wider than that of a standard shank, the nut makes a good strong engagement with the tapered shank for withstanding the application of high torque. Sometimes a pipe wrench is used in an attempt to straighten a bent pipe by pulling laterally on the handle. This is not a normal use, but it is done anyway. In this event, the tapered shank is able to withstand this lateral pull, even though the pull may be excessive. Thus the tapered shank is strong in two ways, both for normal and abnormal use. The adjusting nut works better on my tapered shank in that it engages a greater segment of the circumference of the shank than it would for a standard shank.

The tapered V-shaped shank makes an integral strong right-angle juncture where it meets with the hook jaw. As will be observed in FIGURES 2 and 3, the cross-section of the shank along the line 2—2 is substantially the same as the cross-section of the hook jaw along the line 3—3. This right-angle juncture is subject to excessive strain and it has been found that even the slightest "give" will weaken the grip of the hook jaw on the pipe.

A "give" of a few thousandths of an inch at the juncture is sufficient to permit the gripping teeth to begin to slip and "let go" and skin-off the outer wall of the pipe. Tests indicate that as between the hook jaw and the handle jaw, the hook jaw is the first one to begin to slip and skin-off the outer surface of the pipe. This apparently results from the fact that in a standard pipe wrench, the integral juncture, being weak tends to "give" a little bit sufficiently to allow the pressure on the teeth of the hook jaw to be relieved to the extent that the teeth "back out" (a few thousandths of an inch) from the indentures which they have made in the pipe with the result that the hook jaw teeth begin to slip and skin-off the outer wall of the pipe before the handle jaw teeth begin to slip and skin-off the outer wall of the pipe. With my tapered shank, the right-angle juncture is rigid and the gripping teeth maintain their grip on the pipe under the application of high torque.

As noted in FIGURE 3, the gripping jaw face of the hook jaw has an arcuate surface with arcuate teeth 18 comprising substantially a cylindrical segment, being substantially the same as that for the bottom surface 16 of the shank. The bottom arcuate surface 16 of the shank and the arcuate face of the hook jaw are a continuation of each other. The crest of the teeth and the valley of the teeth are both arcuate. With arcuate teeth, the penetration is more effective than that for straight teeth. For applications of light torque, the penetration is mostly in the center of the arc and as the torque is increased, the penetration spreads toward the side of the jaw. The higher the torque, the greater the penetration and the grip. The teeth on the hook jaw may have a tooth form substantially the same as those shown in Figures 1 and 5 of Patent No. 1,565,338. The face of the handle jaw 12 is likewise arcuate, the same as that for the hook jaw. The arcuate faces of the hook and handle jaws each define a convex contour in a direction crosswise of the jaw face. Each face makes a maximum tooth penetration in the central region intermediate the side edges and a minimum tooth penetration in the side regions near the side edges. The terms "arcuate" and "convex" are used in a generic sense in this application and they comprise all forms wherein the length of the tooth penetration increases as the application of the torque is increased.

In this application, the words "top" and "bottom" as applied to the hook jaw, the shank and the housing, as well as related designations, are used in a general sense and cover all conditions in which the wrench might be used, whether horizontal, vertical or upside-down.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In a nut-fulcrum type pipe wrench comprising a handle with a heel jaw at one end and a hook jaw housing adjacent the heel jaw, said housing having an internal wall defining an opening therethrough, a hook jaw having a shank mounted in said hook jaw housing and extending through said opening, an adjusting nut surrounding and threadably engaging said shank for securing said shank in said housing, said shank having top and bottom surfaces comprising respectively top and bottom substantially cylindrical segments, said shank and said hook jaw integrally meeting with each other and defining substantially an integral juncture, the improvement in said shank and said hook jaw, said shank comprising an inverted substantially V-shaped cross-section defined by said top and bottom surfaces with sloping side surfaces therebetween, said bottom surface of said shank having a greater width than that of said top surface and being substantially the same as the width of said hook jaw.

2. The structure as claimed in claim 1, wherein said shank near said integral juncture has a cross-sectional area substantially the same as that for said hook jaw near said juncture.

3. The structure as claimed in claim 1, wherein said sloping side surfaces of said shank comprise top and bottom ribs with a sunken wall therebetween.

4. The structure as claimed in claim 1, wherein said hook jaw comprises sloping side surfaces, said sloping side surfaces of said shank and of said hook jaw each comprising top and bottom ribs with a sunken wall therebetween.

References Cited by the Examiner
UNITED STATES PATENTS

| | | | |
|---|---|---|---|
| 440,564 | 11/1890 | Hammond. | |
| 460,008 | 9/1891 | Gillespie et al. | 81—102 |
| 653,541 | 7/1900 | Barclay. | |
| 818,419 | 4/1906 | Dalby. | |
| 823,541 | 6/1906 | Norwood | 81—161 |
| 1,727,623 | 9/1929 | Thewes | 81—101 |
| 3,184,999 | 5/1965 | Capra | 81—101 |

WILLIAM FELDMAN, *Primary Examiner.*

MILTON S. MEHR, *Examiner.*